(12) United States Patent
Durocher

(10) Patent No.: US 12,092,031 B2
(45) Date of Patent: Sep. 17, 2024

(54) SWEEP FLOW STRUCTURES FOR FUEL SYSTEMS

(71) Applicant: Pratt & Whitney Canada Corp., Longueuil (CA)

(72) Inventor: Eric Durocher, Boucherville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/246,382

(22) Filed: Apr. 30, 2021

(65) Prior Publication Data

US 2022/0349343 A1    Nov. 3, 2022

(51) Int. Cl.
*F02C 7/22* (2006.01)
*B64D 37/32* (2006.01)
*F02C 3/22* (2006.01)
*F02C 7/25* (2006.01)

(52) U.S. Cl.
CPC .............. *F02C 7/222* (2013.01); *B64D 37/32* (2013.01); *F02C 7/25* (2013.01); *F02C 3/22* (2013.01); *F05D 2220/323* (2013.01); *F05D 2240/35* (2013.01); *F05D 2260/60* (2013.01); *F05D 2260/605* (2013.01)

(58) Field of Classification Search
CPC ................... F02C 7/222; F02C 7/2365; F02C 7/18–185; F02C 6/08; F02C 7/25; F02C 7/22–236; F23R 3/283; F23R 2900/03041–03045; F02M 55/002–007; F05D 2260/602–6022; F05D 2260/601; F05D 2260/205; F05D 2260/605; F05D 2260/608; B64D 2045/009; B64D 37/30; B64D 37/00–34

See application file for complete search history.

(56) References Cited

U.S. PATENT DOCUMENTS

| | | | |
|---|---|---|---|
| 5,918,679 A * | 7/1999 | Cramer | B64D 37/32 169/45 |
| 8,113,181 B2 | 2/2012 | Malm | |
| 8,382,469 B2 | 2/2013 | Malm | |
| 8,978,627 B2 | 3/2015 | Malm | |
| 9,347,377 B2 | 5/2016 | Murakami et al. | |
| 9,518,741 B2 | 12/2016 | Stratton et al. | |
| 9,650,961 B2 | 5/2017 | Hirata et al. | |
| 10,054,057 B2 * | 8/2018 | Zabinski | F16L 39/005 |
| 10,386,259 B2 * | 8/2019 | Zhang | F02C 9/00 |
| 10,473,060 B2 | 11/2019 | Montagne | |
| 10,800,525 B2 * | 10/2020 | Sankrithi | B64C 30/00 |
| 10,830,150 B2 * | 11/2020 | Snyder | F01D 17/02 |
| 2012/0048000 A1 * | 3/2012 | Kirzhner | F02M 37/0017 73/40.5 R |
| 2015/0323188 A1 * | 11/2015 | Rista | F02C 7/00 60/39.463 |

(Continued)

*Primary Examiner* — Stephanie Sebasco Cheng
(74) *Attorney, Agent, or Firm* — NORTON ROSE FULBRIGHT CANADA LLP

(57) ABSTRACT

In accordance with at least one aspect of the present disclosure, there is provided a fuel system of an aircraft engine, comprising: a fuel conduit interface connecting a fuel conduit to a component of the fuel system; and a sweep line structure. The sweep line structure includes an inner surface facing toward, extending around, and defining a cavity around the fuel conduit interface, and an outer surface opposite the inner surface, the cavity being fluidly sealed relative to the outer surface.

9 Claims, 6 Drawing Sheets

(56) References Cited

U.S. PATENT DOCUMENTS

2016/0201917 A1\* 7/2016 Dautova ................ F23R 3/20
  60/785
2020/0173366 A1   6/2020 Akana et al.
2020/0355372 A1   11/2020 Onishi et al.
2022/0145801 A1\* 5/2022 McCurdy Gibson ..... F02C 3/22

\* cited by examiner

Dis-Assembly Condition of the Air Vent Collection

SWEEP FLOW STRUCTURES FOR FUEL SYSTEMS

TECHNICAL FIELD

This disclosure relates to fuel systems, e.g., for aircraft.

BACKGROUND

There is always a need in the art for improvements to fuel systems in the aerospace industry.

SUMMARY

In accordance with at least one aspect of the present disclosure, there is provided a fuel system of an aircraft engine, comprising: a fuel conduit interface connecting a fuel conduit to a component of the fuel system; and a sweep line structure. The sweep line structure includes an inner surface facing toward, extending around, and defining a cavity around the fuel conduit interface, and an outer surface opposite the inner surface, the cavity being fluidly sealed relative to the outer surface.

In embodiments, the system includes a vent conduit that includes the cavity of the sweep line structure and fluidly connects to atmosphere. The fuel conduit interface includes a plurality of fuel conduit interfaces of the fuel system of the aircraft engine. The vent conduit includes a plurality of cavities, the cavity of each fuel conduit interface of the plurality of fuel conduit interfaces being one of the plurality of cavities. The sweep line structure is a plurality of sweep line structures, and wherein the inner surface of each sweep line structure of the plurality of sweep line structures defines the cavity around a fuel conduit interface of the plurality of fuel conduit interfaces that corresponds to that sweep line structure.

In certain embodiments, the plurality of fuel conduit interfaces includes one of or a combination of two or more of any one of: a fuel conduit interface defined by a fuel connection to a fuel nozzle manifold, a fuel conduit interface defined by a fuel connection to a fuel manifold shutoff valve, a fuel conduit interface defined by a fuel connection to a gaseous hydrogen metering unit, a fuel conduit interface defined by a fuel connection to a pressure reducing valve, a fuel conduit interface defined by a fuel connection to a gaseous hydrogen accumulator, and a fuel conduit interface defined by a fuel connection to a liquid hydrogen pump.

In accordance with at least one aspect of the present disclosure, there is provided an aircraft engine, comprising: a compressor supplying pressurized air to a primary gas path of the aircraft engine, the primary gas path including fluidly in series a combustor and an exhaust nozzle receiving gas from the combustor; a bypass duct defining a secondary gas path of the aircraft engine, and the fuel system as described above, the fuel system supplying a fuel to the combustor. The vent conduit vents to the atmosphere via one or both of the exhaust nozzle and the bypass duct.

In embodiments, the vent conduit fluidly connects to a section of the compressor that is at a higher pressure than pressure at an outlet of the vent conduit that connects to the atmosphere. The section is a section of the compressor at which the pressurized air is below 500 degrees Fahrenheit in all normal operating conditions of the aircraft engine. The compressor includes a P2.4 compressor stage, a P2.5 compressor stage, and a P2.7 compressor stage; and the section of the compressor is one of the P2.4 compressor stage, the P2.5 compressor stage, and the P2.7 compressor stage.

In certain embodiments, the vent conduit extends through a hot section of the aircraft engine; and the vent conduit fluidly connects to the section of the compressor at a location in the hot section and at a location outside of the hot section; and at least one fuel conduit interface of the plurality of fuel conduit interfaces is disposed in the hot section at a location in the vent conduit that is fluidly between the location at which the vent conduit fluidly connects to the section of the compressor and the outlet of the vent conduit that connects to the atmosphere.

In embodiments, a temperature sensor is operatively connected to the vent conduit at a location upstream of the outlet of the vent conduit, the temperature sensor operable to sense temperature of a gas at that location.

In embodiments, a hydrogen sensor is operatively connected to the vent conduit at a location upstream of the outlet of the vent conduit, the hydrogen sensor operable to sense at that location one or both of: presence of hydrogen and/or concentration of hydrogen. In certain embodiments, the outlet of the vent conduit can include a plurality of outlets fluidly venting the vent conduit to the atmosphere at different locations in the vent conduit.

In certain embodiments, a sweep structure for a fuel system includes a sweep line structure configured to surround at least a portion of a fuel line and forming a line flow cavity. In certain embodiments, the sweep structure includes a first sweep fitting structure configured to engage the sweep line structure at a first axial opening, the first sweep fitting structure forming a fitting flow cavity. In certain embodiments, the first sweep fitting structure is configured to surround one or more of a first end portion of the fuel line, a first end fitting attached to the fuel line, and/or a first opening of a fuel system component attached to the first end fitting. In certain embodiments, the first sweep fitting structure defines a first radial opening, the first radial opening configured to receive a bridge channel.

In certain embodiments, the sweep line structure defines a first connection end configured to engage with a retainer to retain the sweep line structure to the first sweep fitting structure. In certain embodiments, the first sweep fitting structure is configured to be moveable relative to the sweep line structure when the retainer is not engaged to the sweep line structure. In certain embodiments, the first sweep fitting structure includes a first seal groove configured to receive a first seal to seal against the sweep line structure, and a second seal groove configured to receive a second seal to seal against the first opening of the fuel system component.

In certain embodiments, the first connection end includes a snap ring groove configured to receive a snap ring to retain the first sweep fitting structure between the snap ring and the fuel system component. In certain embodiments, the first connection end defines an inner diameter mount configured to mount the fuel line concentrically therethrough.

In certain embodiments, the inner diameter mount includes an inner diameter tube shape axially extending from the first connection end. In certain embodiments, the first connection end defines one or more holes defined at least partially axially therethrough to allow sweep flow to pass through the first connection end.

In certain embodiments, the sweep structure can include a bridge channel disposed in fluid commination with the first sweep fitting structure and configured to direct sweep flow around the fuel system component. In certain embodiments, the bridge channel is a flexible hose configured to allow the first sweep fitting structure to move relative to the sweep line structure without disconnecting the bridge channel from the first sweep fitting structure. In certain embodiments, the bridge channel is connected to a second sweep fitting structure to pass flow thereto to allow flow to a second sweep line structure.

In certain embodiments, the sweep line structure defines a second connection end at an opposite end relative to the first connection end, wherein the second connection end is the same as the first connection end. In certain embodiments, the sweep structure includes a second sweep fitting structure configured to engage to the second connection end. In certain embodiments, the second sweep fitting structure is the same as the first sweep fitting structure.

In certain embodiments, the sweep structure includes a series of sweep line structures connected in series via respective sweep fitting structures. Any suitable number of sweep line structures and sweep fitting structures in any suitable series is contemplated herein.

In certain embodiments, a fuel system includes a fuel line, a fuel system component in fluid communication with the fuel line and connected to the fuel line at a first opening thereof, and a sweep system. In certain embodiments, the sweep system is or includes any suitable sweep structure disclosed herein, e.g., as described above. For example, in certain embodiments, the sweep system includes a sweep line structure configured to surround at least a portion of the fuel line and forming a line flow cavity, and a first sweep fitting structure configured to engage the sweep line structure at a first axial opening, the first sweep fitting structure forming a fitting flow cavity, the first sweep fitting structure configured to surround one or more of a first end portion of the fuel line, a first end fitting attached to the fuel line, and/or the first opening of the fuel system component attached to the first end fitting, wherein the first sweep fitting structure defines a first radial opening, the first radial opening configured to receive a bridge channel.

In certain embodiments, a fuel system includes one or more fuel lines connected to one or more fuel components at one or more connections, and a sweep system defining a fluid path surrounding the one or more fuel lines and each connection between each of the one or more fuel lines and the one or more connections, the sweep system configured to allow sweeping of leaked fuel from the fuel lines to a vent. In certain embodiments, the sweep system includes a retainable moveable component configured to provide access to the one or more connections and/or to allow removal of one or more components of the sweep system when moved to an access position. The fuel system can include any suitable embodiment of a sweep system and/or sweep structure in accordance with this disclosure.

In certain embodiments, a fuel system includes one or more fuel circuit components configured to retain a flow of fuel therethrough, and a sweep structure defining a sweep flow path. In certain embodiments, the sweep structure surrounds at least a portion of the one or more fuel circuit components and configured to allow a sweep fluid to move a leaked fuel from the one or more fuel circuit components to a vent portion.

In certain embodiments, the sweep structure includes at least one leak detection location positioned fluidly downstream from the one or more fuel circuit components and having one or more leak detection sensors connected to the sweep structure. For example, in certain embodiments, the one or more leak detection sensors include a fuel sensor configured to detect a presence of the fuel in the sweep flow path. In certain embodiments, the one or more leak detection sensors include a temperature sensor configured to detect a temperature in the sweep flow path.

In certain embodiments, the sweep structure includes an inlet configured to receive sweep fluid from a source. In certain embodiments, the fuel is hydrogen and the sweep fluid can be pressurized air. For example, in certain embodiments, the inlet of the sweep structure is configured to connect to a compressor (e.g., of a turbomachine) to receive compressor air.

In certain embodiments, the one or more fuel circuit components include a plurality of flow components (e.g., a pump, accumulator, pressure regulating valve, a metering unit, and/or a manifold shut off valve) and a plurality of fuel line segments extending between each of the plurality of fuel components. In certain embodiments, the one or more fuel circuit components include a fuel nozzle manifold, wherein the vent portion is downstream of the fuel nozzle manifold.

In certain embodiments, the sweep structure surrounds each connection between each flow component and each fuel line. In certain embodiments, a sweep structure is sealingly engaged to each flow component such that the sweep flow path is substantially sealed between the inlet and the vent portion. In certain embodiments, the sweep structure includes a bypass line passing around each flow component to allow continuous flow from the inlet to the vent portion.

In certain embodiments, the sweep structure is a first sweep structure and the fuel system further includes a second sweep structure. In certain embodiments, the first sweep structure is configured to sweep a cold zone portion of a fuel system to a first vent portion, and the second sweep structure is configured to sweep a hot zone portion of the fuel system to a second vent portion. In certain embodiments, each first and second sweep structures include a respective inlet and a respective vent portion. In certain embodiments, each sweep structure includes a leak detection location positioned downstream of the one or more fuel circuit components associated with each sweep structure. In certain embodiments, each sweep structure includes one or more leak detection sensors.

In certain embodiments, the fuel system includes a control module configured to determine whether a leak has occurred and to operate at least one of the one or more fuel components based on the detected leak. In certain embodiments, the control module is configured to shut down fuel flow if a leak is detected above a threshold.

In accordance with at least one aspect of this disclosure, a hydrogen fuel system for an aircraft includes a hydrogen fuel circuit and a leak detection system coupled to the hydrogen fuel circuit to and configured to detect a hydrogen leak from at least a portion of the hydrogen fuel circuit by sweeping at least a portion of the hydrogen fuel circuit with a sweep gas to a leak detection location having one or more leak detection sensors. In certain embodiments, the leak detection system includes a single sweep structure configured to sweep the entire hydrogen fuel circuit between a first location and one or more fuel nozzles. In certain embodiments, the one or more leak detection sensors are downstream of a fuel nozzle manifold in the sweep structure.

In certain embodiments, the leak detection system includes a first sweep structure configured to sweep a cold zone portion of the hydrogen fuel circuit and to a first vent portion, and wherein the leak detection system includes a second sweep structure configured to sweep a hot zone portion of the hydrogen fuel circuit to a second vent portion. In certain embodiments, the system includes a controller configured to control one or more components in the hydrogen fuel circuit as a function of signals received from the one or more leak detection sensors.

In accordance with at least one aspect of this disclosure, a method includes sweeping a sweep fluid over a fuel circuit to vent leaked fuel and/or to move leaked fuel to a leak detection location. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
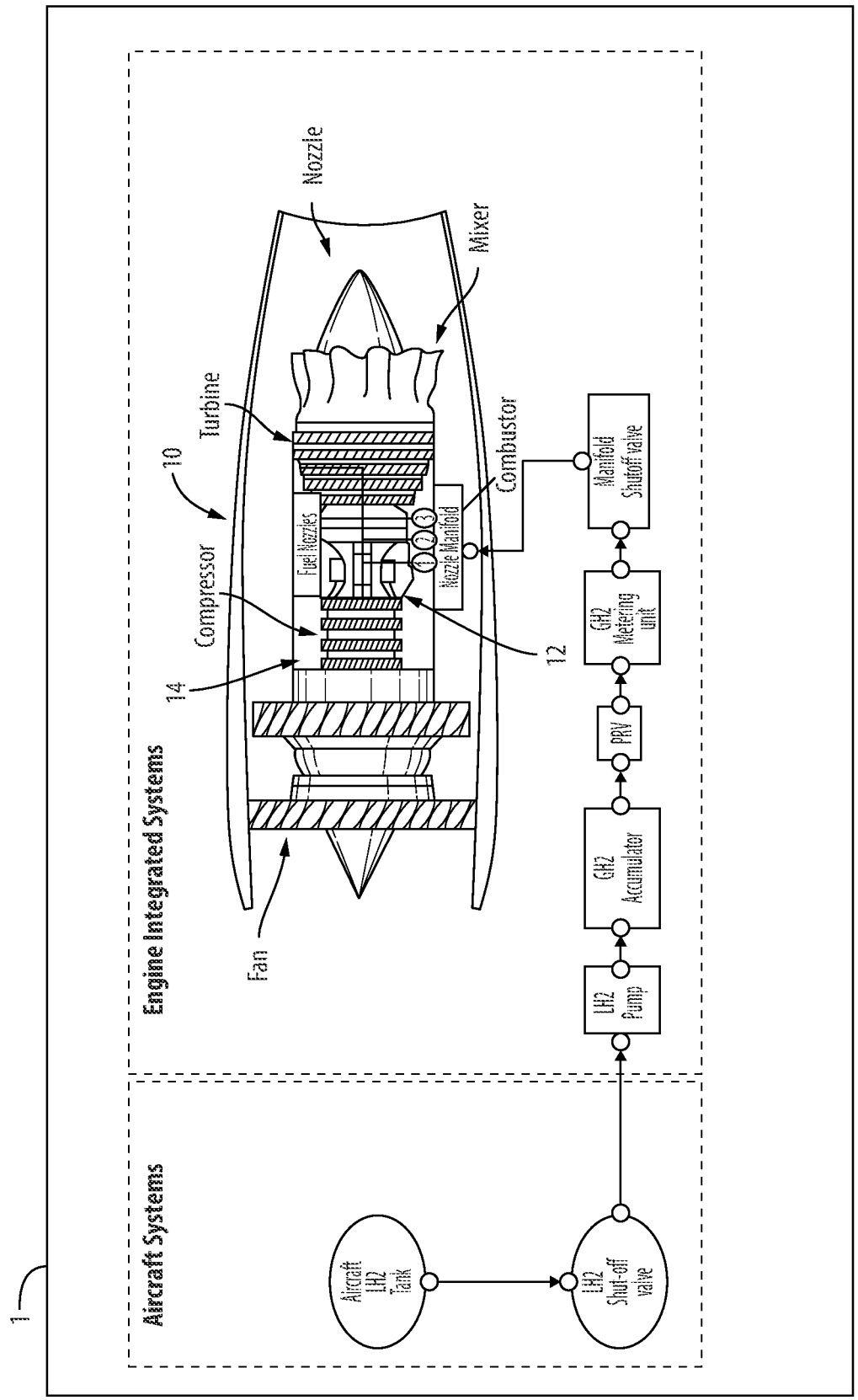
FIG. 1 is a schematic diagram of an embodiment of an aircraft having a fuel system in accordance with this disclosure.

Reference will now be made to the drawings wherein like reference numerals identify similar structural features or aspects of the subject disclosure. For purposes of explanation and illustration, and not limitation, an illustrative view of an embodiment of a fuel system in accordance with the disclosure is shown in FIG. 1 and is designated generally by reference character 100. Other embodiments and/or aspects of this disclosure are shown in FIGS. 2-6.

In certain embodiments, referring to FIG. 1, an aircraft 1 includes an engine 10, where the engine can be a propulsive energy engine (e.g. creating thrust for the aircraft 1), or a non-propulsive energy engine, and a fuel system 100. A compressor 14 supplies pressurized air to a primary gas path 12 (e.g. as shown in FIG. 1) of the aircraft engine 10, the primary gas path 12 including fluidly in series a combustor and nozzle manifold for issued fluid to the combustor.

Figure 2:
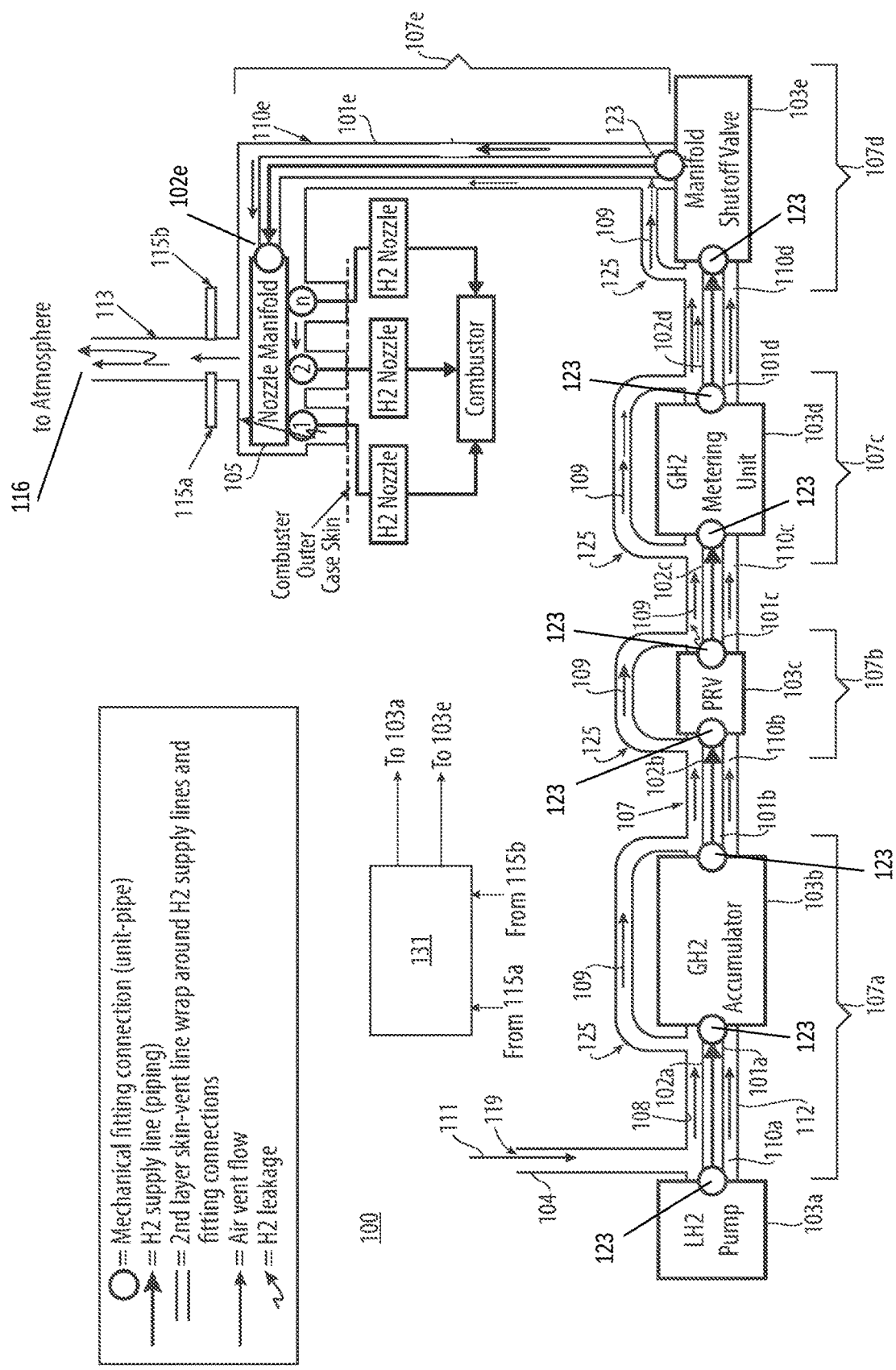
FIG. 2 is a schematic diagram of an embodiment of the fuel system of FIG. 1.

Referring now to FIG. 2, the fuel system 100 comprises a fuel conduit interface 102 connecting a fuel conduit 104 to a component 101a,b, c, d, e, 103a, b, c, d, e, 105 of the fuel system 100; and a sweep line structure 107. As used herein, a conduit can include one or a combination of components forming a flow path 109 between at least two points, for example a fuel conduit 104 fluidly connecting component any of components 101a,b, c, d, e, 103a, b, c, d, e, 105 to another, may be any one of or a combination of: a fuel line, fuel filter, heat exchanger, or the like. In contrast, as used herein, a fuel line can be defined as a tube carrying fuel from one end of the tube to another.

The sweep line structure 107 includes an inner surface 108 facing toward, extending around, and defining a cavity 110 around the fuel conduit interface 102, and an outer surface 112 opposite the inner surface 108, the cavity 110 being fluidly sealed relative to the outer surface 112.

In embodiments, the system includes a vent conduit 113 that includes the cavity 110 of the sweep line structure 107 and fluidly connects to atmosphere A. In embodiments, the fuel conduit interface 102 can include a plurality of fuel conduit interfaces 102a, b, c, d, e of the fuel system 100 of the aircraft engine 10, for example. The vent conduit 113 includes a plurality of cavities 110a, b, c, d, e, the cavity 110a, b, c, d, e of each fuel conduit interface 102a, b, c, d, e of the plurality of fuel conduit interfaces 102a, b, c, d, e being one of the plurality of cavities 110a, b, c, d, e. In certain embodiments, the sweep line structure 107 is a plurality of sweep line structures 107a, b, c, d, e, and wherein the inner surface 108 of each sweep line structure 107 of the plurality of sweep line structures 107a, b, c, d, e defines the cavity 110a, b, c, d, e around a fuel conduit interface 102a, b, c, d, e of the plurality of fuel conduit interfaces 102a, b, c, d, e that corresponds to that sweep line structure 107a, b, c, d, e.

In certain embodiments, the sweep structure 107 surrounds at least a portion of the one or more fuel circuit components (e.g., fuel line segments 101a, b, c, d, e and connections to other components 103a, b, c, d, e) so as to allow a sweep fluid 111 to move a leaked fuel (e.g., leaked from a seal location or through a material) from the one or more fuel circuit components to the vent conduit 113 (e.g., in fluid communication with an outlet, e.g., atmosphere, exhaust nozzle, or an inner bypass fan duct). In certain embodiments, the sweep structure 107 surrounds each connection 123 (e.g., a mechanical fitting) between each flow component 103a, b, c, d, e, 105 and each fuel line 101a, b, c, d, e.

In certain embodiments, the plurality of fuel conduit interfaces 102a, b, c, d, e includes one of or a combination of two or more of any one of: a fuel conduit interface 102e defined by a fuel connection to a fuel nozzle manifold (e.g. component 105), a fuel conduit interface 102d defined by a fuel connection to a fuel manifold shutoff valve (e.g. component 103e), a fuel conduit interface 102c defined by a fuel connection to a gaseous hydrogen metering unit (e.g. component 103d), a fuel conduit interface 102b defined by a fuel connection to a pressure reducing valve (e.g. component 103c), a fuel conduit interface 102a defined by a fuel connection to a gaseous hydrogen accumulator (e.g. component 103b), and a fuel conduit interface 102 defined by a fuel connection to a liquid hydrogen pump (e.g. component 103a).

The sweep structure 107 can be in fluid communication with a sweep flow source. For example, the sweep flow source can be a pressurized air source (e.g., bled from a compressor or separately pumped) to create a constant flow in the sweep structure 100. Any other suitable flow source and/or fluid is contemplated herein. In certain embodiments, the sweep structure 107 includes an inlet 119 configured to receive sweep fluid 111 from a source. For example, in certain embodiments, the inlet 119 of the sweep structure 107 can be configured to connect to the compressor 14 (e.g., a low pressure compressor stage of a turbomachine) to receive compressor air. The sweep structure 107 is sealingly engaged to each flow component 103a, b, c, d, e such that the sweep flow path 109 is substantially sealed between the inlet 119 and the vent portion 113.

In certain embodiments, the sweep structure 107 includes a bypass line 125 passing around each flow component 103a, b, c, d, e to allow continuous flow from the inlet 119 to the vent portion 113. As shown, in certain embodiments, the sweep structure 107 can fully encompass the entire fuel system or any suitable portion thereof (e.g., from a fuel tank to a combustor, e.g., a combustor outer casing).

In embodiments, the vent 113 conduit fluidly connects to a section of the compressor 14 that is at a higher pressure than pressure at an outlet of the vent conduit 113 that connects to the atmosphere. The section is a section of the compressor at which the pressurized air is below 500 degrees Fahrenheit in all normal operating conditions of the aircraft engine 10. The compressor can include a P2.4 compressor stage, a P2.5 compressor stage, and a P2.7 compressor stage; and the section of the compressor is one of the P2.4 compressor stage, the P2.5 compressor stage, and the P2.7 compressor stage.

In certain embodiments, the fuel is hydrogen (e.g., which is more prone to leaking than traditional fuel). In certain such embodiments, a hydrogen sensor 115a is operatively connected to the vent conduit 113 at a location upstream of the outlet 116 of the vent conduit 113, the hydrogen sensor 115 a being operable to sense at that location one or both of: presence of hydrogen and/or concentration of hydrogen. In certain embodiments, the outlet 116 of the vent conduit 113 can include a plurality of outlets fluidly venting the vent conduit 113 to the atmosphere at different locations in the vent conduit 113 (for example as described with respect to FIG. 2. In embodiments, a temperature sensor 115b is operatively connected to the vent conduit 113 at a location upstream of the outlet 116 of the vent conduit 113, the temperature sensor 115b being operable to sense temperature of a gas at that location.

Figure 3:
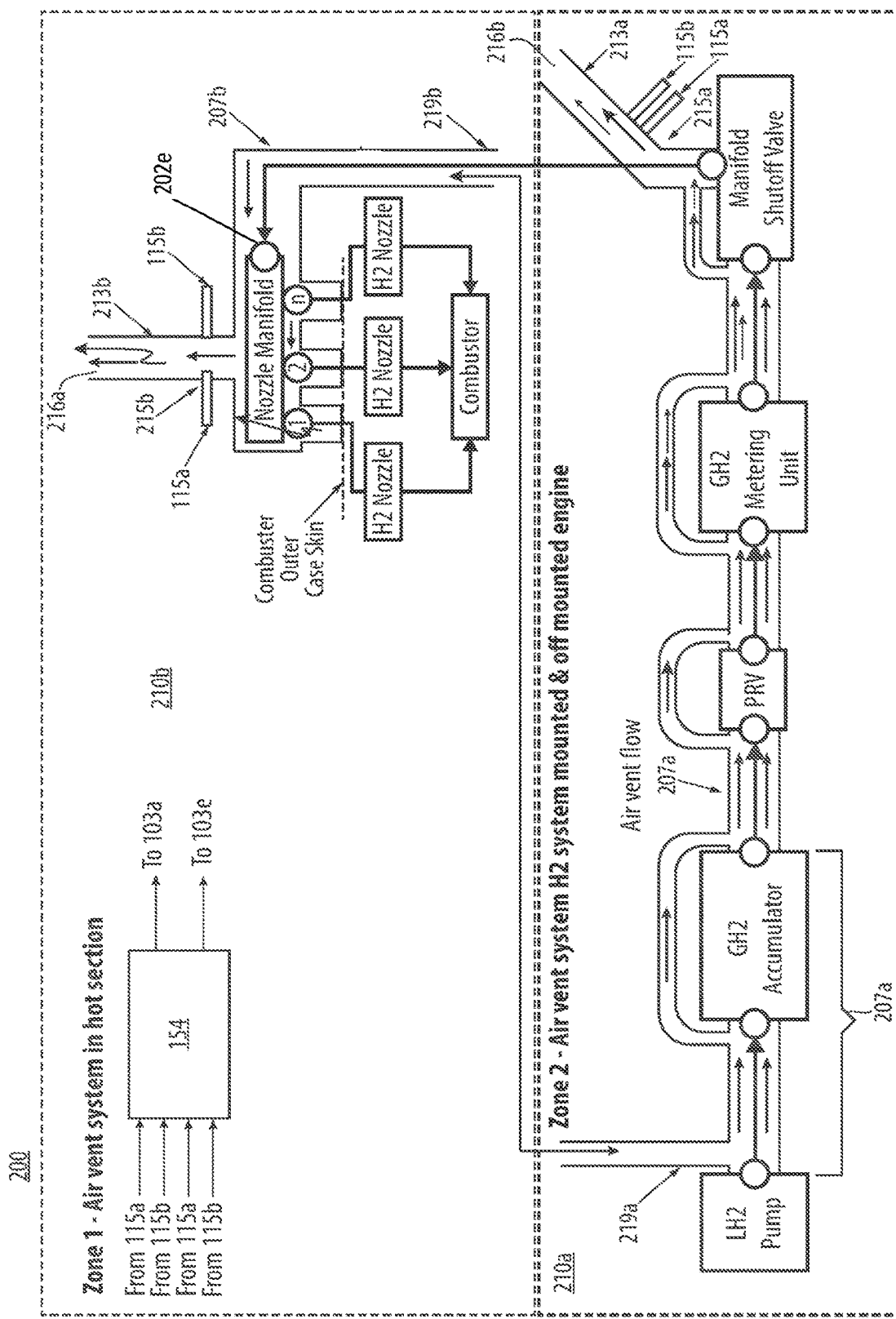
FIG. 3 is a schematic diagram of another embodiment of the fuel system of FIG. 1.

In certain embodiments, referring to FIG. 3, the sweep structure can be a first sweep structure 207a and the fuel system 200 can further include a second sweep structure 207b. In certain embodiments, the vent conduit 213b extends through a hot section (e.g. Zone 1) of the aircraft engine 10; and the vent conduit 213b fluidly connects to the section of the compressor at a location in the hot section. The vent conduit 213a can connect to the compressor at a location outside of the hot section (e.g. Zone 2). At least one fuel conduit interface 202e of the plurality of fuel conduit interfaces is disposed in the hot section at a location in the vent conduit 213b that is fluidly between the location at which the vent conduit fluidly connects to the section of the compressor and the outlet of the vent conduit that connects to the atmosphere.

In this manner, the first sweep structure 207a is configured to sweep a cold zone portion 210a of the fuel system 200 to a first vent portion 213a (e.g., in fluid communication with an atmosphere or bypass duct), and the second sweep structure 207b is configured to sweep a hot zone portion 210b of the fuel system 200 to a second vent portion 213b (e.g., in fluid communication with an exhaust or bypass duct, for example). The first vent portion 213a and the second vent portion 213b can be connected to the same or different outlets.

In certain embodiments, each of the first and second sweep structures 207a, 207b can include a respective inlet 219a, 219b (e.g., mounted on or off the engine) and a respective vent portion 213a, 213b. In certain embodiments, each sweep structure 207a, 207b includes a leak detection location 215a, 215b positioned downstream of the one or more fuel circuit components associated with each sweep structure 207a, 207b. In certain embodiments, each sweep structure 207a, 207b includes one or more leak detection sensors 115a, 115b (e.g., as disclosed above).

Figure 4:
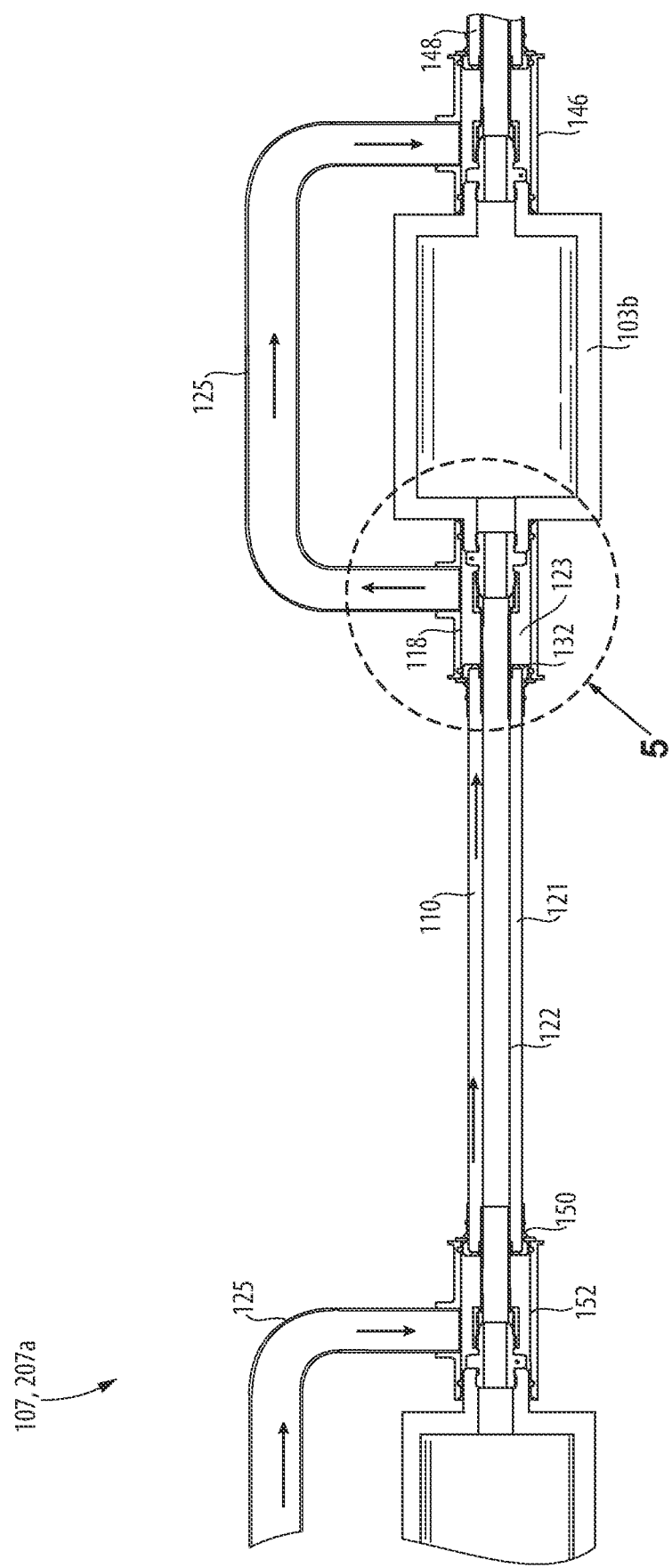
FIG. 4 is a schematic cross-sectional view of an embodiment of the fuel system of FIG. 1, shown having an embodiment of a sweep structure in accordance with this disclosure.
Figure 5:
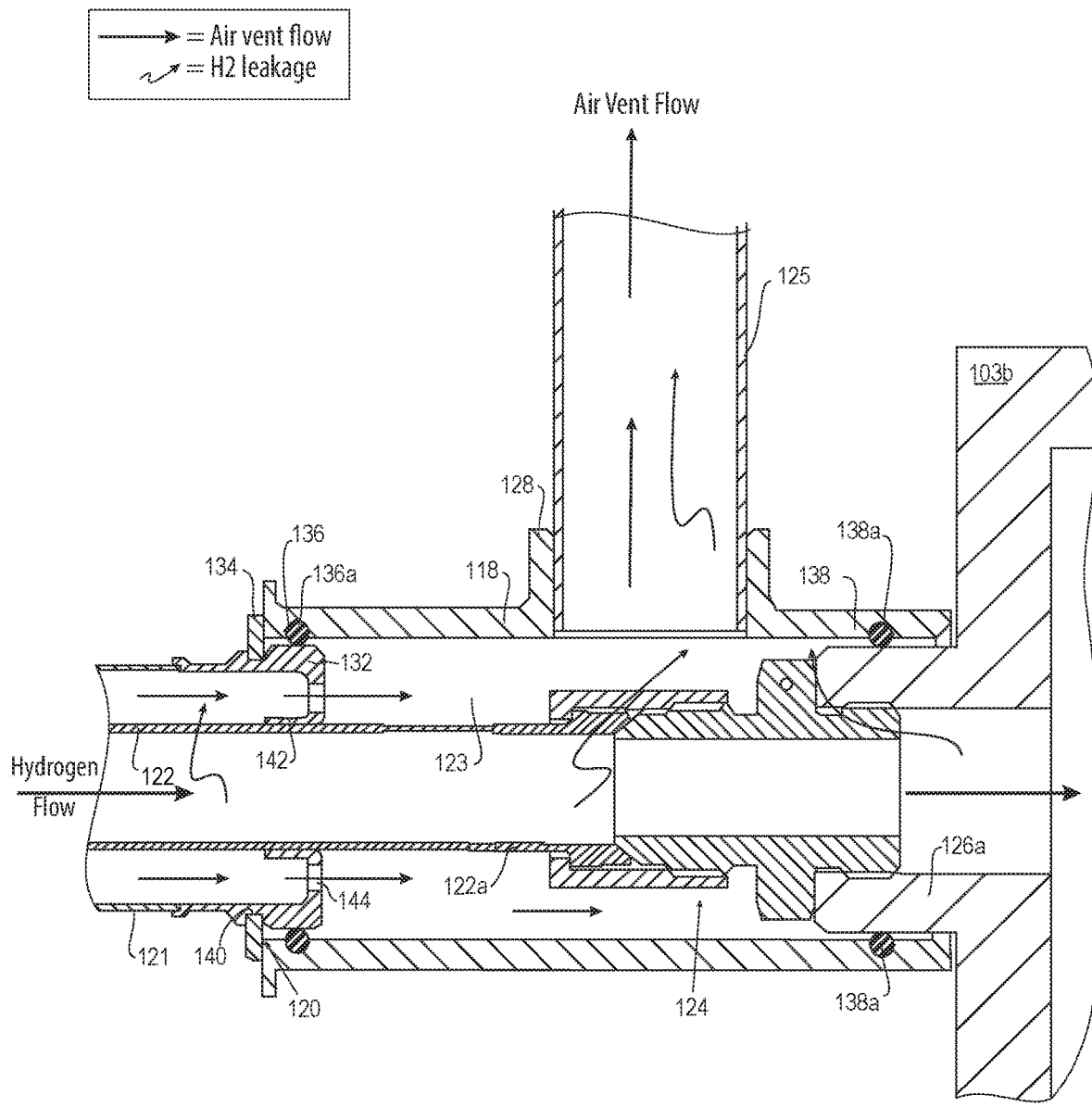
FIG. 5 is a close up view of the sweep structure of FIG. 4 at a sweep fitting structure thereof.

In certain embodiments, such as the example shown in FIG. 4, the sweep structure 107, 207a includes a fitting structure 118 configured to engage a sweep line structure 121 at a first axial opening 120. The first sweep fitting structure 118 can form a fitting flow cavity 123. In certain embodiments, the first sweep fitting structure 118 is configured to surround one or more (e.g., all as shown) of a first end portion 122a of the fuel line 122, a first end fitting 124 (e.g., all or a portion thereof) attached to the fuel line 122, and/or a first opening 126a of a fuel system component (e.g. component 103a, b, c, d, e, 105) attached to the first end fitting 124.

In certain embodiments, the first end fitting 124 can be integral with the first end portion 122a. The first end fitting 124 can include any suitable number of parts (e.g., two as shown) configured to allow the fuel line 122 to fluidly connect to the first opening 126a. Any suitable type of fitting components (e.g. a threaded nipple) is contemplated herein.

In certain embodiments, the first sweep fitting structure 118 defines a first radial opening 128. The first radial opening 128 can be configured to receive a bridge channel (e.g. bypass line 125), e.g., as shown. The first radial opening 128 can be located closer to the fuel system component 103a, b, c, d, e than the axial opening 120, for example.

Figure 6:
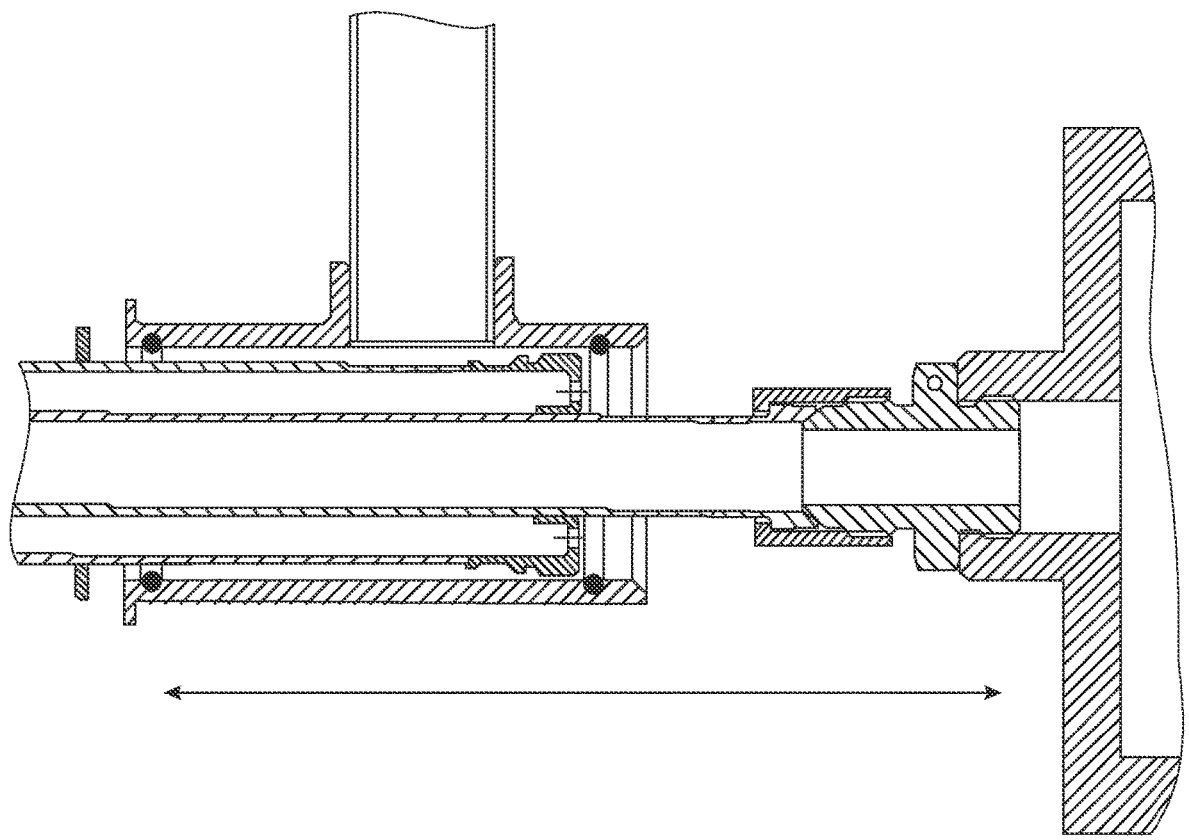
FIG. 6 shows sliding motion of the embodiment of a sweep fitting structure of FIG. 3 in accordance with this disclosure.

In certain embodiments, the sweep line structure 121 defines a first connection end 132 configured to engage with a retainer 134 (e.g., an axial retention device) to retain the sweep line structure 121 to the first sweep fitting structure 118. In certain embodiments, referring additionally to FIG. 6, the first sweep fitting structure 118 is configured to be moveable (e.g., slidable as shown in FIG. 6) relative to the sweep line structure 121 when the retainer 134 is not engaged to the sweep line structure 121.

In certain embodiments, the first sweep fitting structure 118 includes a first seal groove 136 configured to receive a first seal 136a to seal against the sweep line structure 121. In certain embodiments, the first sweep fitting structure 118 can include a second seal groove 138 configured to receive a second seal 138a to seal against the first opening 126a of the fuel system component 103 a, b, c, d, e. The first seal 136a and the second seal 138a can be an o-ring seal or any other suitable seal. Any other suitable seal arrangement configured to seal the components together to create a sealed sweep flow path (e.g., at least partially formed by the cavities 110, 123) is contemplated herein.

In certain embodiments, the first connection end 132 includes a snap ring groove 140 configured to receive a snap ring (e.g., retainer 134 being shown as a snap ring type retainer) to retain the first sweep fitting structure 118 (e.g., axially) between the snap ring (e.g., retainer 134) and the fuel system component 103 a, b, c, d, e. Any other suitable type of retainer structure for any suitable type of retainer is contemplated herein.

In certain embodiments, the first connection end 132 defines an inner diameter mount 142 configured to mount the fuel line 122 concentrically therethrough. In certain embodiments, the inner diameter mount 142 includes an inner diameter tube shape axially extending from the first connection end 132. For example, as shown, the inner diameter mount 142 can form a cylindrical shape (or other complimentary shape to the fuel line 122) having an inner diameter that is the same or about the same size (e.g., to allow sliding) as an outer diameter of the fuel line 122. As shown, the inner diameter mount 142 can extend away from the first connection end 132 (e.g., away from the sweep fitting structure 118), however, any other suitable structure or direction of extension is contemplated herein. The sweep line structure 121 and/or the connection end 132 can be made using additive manufacturing, for example, to create the shown complex shape jacketed fluid line and connection.

In certain embodiments, the first connection end 132 defines one or more holes 144 defined at least partially axially therethrough (e.g., in a vertical wall of the first connection end) to allow sweep flow (e.g., air) to pass through the first connection end. Any suitable number of holes 144 is contemplated herein.

In certain embodiments, the bridge channel 125 is disposed in fluid commination with the first sweep fitting structure 118 (e.g., at the first radial opening 128 as shown) and configured to direct sweep flow around the fuel system component 103 a, b, c, d, e. In certain embodiments, the bridge channel 125 is connected to a second sweep fitting structure 146 to pass flow thereto to allow flow to a second sweep line structure 148. However, in certain embodiments, the bridge channel 125 can be connected to a vent (e.g. vent 113, 213). It is contemplated that a last bridge channel 125 in a series can be connected to a vent, for example.

In certain embodiments, the bridge channel 125 is a flexible hose (e.g., braided steel) configured to allow the first sweep fitting structure 118 to move relative to the sweep line structure 121 without disconnecting the bridge channel 125 from the first sweep fitting structure 118 (and without having to disconnect any other mounted portion of the bridge channel 125, e.g., at a second sweep fitting structure 146. The bridge channel 125 can be a rigid channel in certain embodiments, but may require removal from one or more connections (e.g., from first fitting structure 118) before being able to slide the first fitting structure away from the fuel system component 103 a, b, c, d, e (e.g., to gain line of sight access to the fuel line and/or fittings).

In certain embodiments, the bridge channel 125 can be connected to the first sweep fitting structure 118 (e.g., and any other sweep fitting structure at another end) in any suitable manner to provide a sealed sweep flow path. For example, a nipple-ferrule-nut connection can be used. Any other suitable connection type is contemplated herein.

In certain embodiments, the sweep line structure 107, 207a defines a second connection end 120 at an opposite end relative to the first connection end 121. The second connection end 150 can be the same as the first connection end 132, for example (e.g., but facing an opposite direction). However, it is contemplated that the second connection end 150 can be different from the first connection end 132 in any suitable manner. In certain embodiments, the sweep structure 107, 207a includes a second sweep fitting structure 152 configured to engage to the second connection end 150, e.g., as shown in FIG. 4, and the same as disclosed above with respect to connection end 132 and first sweep fitting structure 118. In certain embodiments, the second sweep fitting structure 152 is the same as the first sweep fitting structure 118, however, it is contemplated that the second sweep fitting structure 152 can be different from the first sweep fitting structure 118 in any suitable manner.

In certain embodiments, the sweep structure 107, 207a includes a series of sweep line structures 121, 148 connected in series via respective sweep fitting structures 118, 152. Any suitable number of sweep line structures 121, 148 and sweep fitting structures 146, 118, 152 in any suitable series is contemplated herein (e.g., configured to cover the entire fuel system or any suitable portion thereof).

In certain embodiments, the fuel system 100, 200 includes a control module 154 configured to determine whether a leak has occurred and to operate at least one of the one or more fuel components (e.g., pump 103a and/or valve 103e) based on the detected leak. In certain embodiments, the control module 131 is operatively connected to one or more components and can be configured to shut down or otherwise reduce fuel flow (e.g., to stop the pump 103a and/or to close valve 103e) if a leak is detected above a threshold (e.g., if an amount of hydrogen exceeds a high threshold or if a temperature exceeds a threshold indicating hydrogen burning in the sweep flow path). In certain embodiments, e.g., as shown in FIG. 2, the control module 131 can be configured to determine a location of a leak based on which detection location is indicating a leak.

For example, if fuel from the fuel circuit is detected at the detection location 215a, the control module 154 can determine that a leak exists in the cold section, and may gauge the severity of the leak based on the amount of fuel detected (e.g., the control module 131 may allow continued operation below a certain threshold with sufficient sweeping due to low risk of ignition in the cold section). If fuel from the fuel circuit is detected at the detection location 215, the control module 154 can determine that a hot section leak is present (e.g., from a fuel line, nozzle manifold, or other component) and can shut down the system, e.g., to prevent ignition in the hot section. Any suitable number of detection locations and sensors for detecting a leak in any suitable divisions of the fuel system is contemplated herein. The control module 154 can be operatively connected to any suitable component(s) to control any suitable components (e.g., a bleed valve to control sweep air flow, an inhibitor gas system for introducing inhibitor gas into the sweep flow path).

In accordance with at least one aspect of this disclosure, certain embodiments can be a hydrogen fuel system for an aircraft and can include a hydrogen fuel circuit and a leak detection system coupled to the hydrogen fuel circuit to and configured to detect a hydrogen leak from at least a portion of the hydrogen fuel circuit by sweeping at least a portion of the hydrogen fuel circuit with a sweep gas to a leak detection location having one or more leak detection sensors. In certain embodiments, e.g., as shown in FIG. 2, the leak detection system includes a single sweep structure configured to sweep the entire hydrogen fuel circuit between a first location and one or more fuel nozzles. In certain embodiments, the one or more leak detection sensors are downstream of a fuel nozzle manifold in the sweep structure.

In certain embodiments, as shown in FIG. 3, the leak detection system includes a first sweep structure configured to sweep a cold zone portion of the hydrogen fuel circuit and to a first vent portion, and wherein the leak detection system includes a second sweep structure configured to sweep a hot zone portion of the hydrogen fuel circuit to a second vent portion. In certain embodiments, the system includes a controller configured to control one or more components in the hydrogen fuel circuit as a function of signals received from the one or more leak detection sensors.

In accordance with at least one aspect of this disclosure, a method includes sweeping a sweep fluid over a fuel circuit to vent leaked fuel and/or to move leaked fuel to a leak detection location. The method can include any other suitable method(s) and/or portion(s) thereof.

Embodiments can include a single or multi vent embodiment, e.g., having a sweep structure made of a tube (e.g., a rigid metallic material such as high temp stainless steel). In embodiments, air can consistently sweep the fuel, e.g., hydrogen to a vent. Embodiments can include sweep that surrounds the entire hydrogen flow pathway and covers all leak areas to vent the leaked hydrogen. Embodiments can use an hydrogen sensor to detect a leak or a serious leak. A temperature sensor can be employed to sense if a leak starts a fire in the vent line, In certain embodiments, a controller can shut down flow in event of serious leakage detected, Certain multi zone embodiments can be divided into hot section and cold section. Some portion of exposed fuel line not in a sweeping circuit may exist in such embodiments, but a leakage can be more accurately located allowing a user or control module to react differently based on zone. Typical aircraft engine fuel supply system contains multiples fitting and coupling connections that may lead to a hydrogen leak. Hydrogen can leak at every connection and through the pipes carrying the hydrogen even (e.g., through a microcrack generated from hydrogen embrittlement phenomena). Hydrogen is far more volatile and prone to escape than conventional fuels. In certain cases, hydrogen gas can collect in parts of an airframe and can present a suffocation or explosion hazard. Some leaked hydrogen can simply auto-ignite in contact with hot surfaces of the engine (e.g., gas generator case, turbine support case, exhaust duct).

Embodiments can provide a fuel supply leakage detection and purging system for hydrogen aircraft engine, for example. Embodiments can include an air vent system integrated with the hydrogen (hydrogen) supply system such that all hydrogen supply lines and fitting connections are surrounded by a second layer skin that acts as a container (e.g., a tube in a tube) which is sealed and where a minimum constant air mass flow is passing between hydrogen supply line and second layer skin to catch and evacuate any hydrogen leakage that may occurs at any fitting connection or/and through hydrogen tube (cracks).

Air vent flow could be taken from engine compressor stage, or from OEM/engine accessory air compressor unit, for example (e.g., maximum air temperature of source being less than 500 degrees F. and where total pressure is higher than pressure at outlet). Also the air vent system can be designed to maintain an adequate air pressure differential between air vent inlet and the air vent outlet to ensure minimal air flow velocity and adequate ventilation rate to reduce hydrogen/air ratio in case of hydrogen leakage from hydrogen supply system and therefore reduce risk of hydrogen ignition/fire.

Embodiments can evacuate any hydrogen leakage flow from hydrogen supply system from a vent outlet which could be located outside aircraft (atmosphere) or in exhaust jet nozzle or in a fan inner/outer bypass duct. A hydrogen sensor and temperature sensor can be installed in air vent outlet duct to detect abnormal hydrogen leakage level or/and abnormal air temperature raised that may indicate hydrogen fire situation. In certain embodiments, when abnormal hydrogen leakage or/and abnormal air temperature are detected, the control module can control a bleed air modulated valve could be used to increase air bleed flow through vent line system to dilute concentration of hydrogen in the air vent line. In certain embodiments, if abnormal temperature is detected by the temperature sensor in the air vent outlet duct, an inhibitor gas unit can be controlled by the control module to release inhibitor gas (e.g., nitrogen, CH3Br, CBrF3) to the air vent line to extinguish hydrogen diffusion flames.

In certain embodiments, instead of have a single air vent network, certain embodiments can include splitting the air venting network in two or more zones. The first zone can bring venting air to the fuel supply system located outside the engine (external-mounted or off mounted). The second zone can bring venting air to fuel supply system located inside the engine (e.g., core) located in the hot section. Such embodiments can allow the control module to identify which zone hydrogen leakage occurs where consequences/risks are not same between zone 1 and 2. Such embodiments can also reduce size of vent/hydrogen tube passing thru bypass duct service fairing (e.g., to reduce aerodynamic blocking in bypass duct) for a turbofan type engine.

Embodiments can allow aircraft engines to safely use hydrogen as a fuel type. For example, embodiments provide a solution to mitigate the risk of hydrogen fluid leakages that may occur from aircraft engine fuel supply systems and where consequences may generate hazardous conditions (e.g., fire, explosion) in an aircraft power plant that may compromise aircraft/engine safety and airworthiness certification.

Certain embodiments disclosed herein include a system to detect, contain, and purge any hydrogen fluid leakages that may come out from an aircraft engine fuel supply system. A venting system can be comprised of a primary fluid supply system surrounded by a secondary fluid system acting as a container with the intent to capture leaks from the primary system and vent the leak out. The second layer can have a vent inlet and outlet for a secondary fluid to flow. The secondary fluid system can wrap around or bypass components that are using the primary fluid. The secondary inlet flow can be forced. The secondary outlet vent can have sensors for detecting temperature and fluid composition. The primary fluid can be hydrogen, for example. In accordance with at least one aspect of this disclosure, a fuel system 100 includes a fuel line 122, a fuel system component 103 *a, b, c, d, e* in fluid communication with the fuel line 122 and connected to the fuel line 122 at a first opening thereof 126*a*, and a sweep system. In certain embodiments, the sweep system is or includes any suitable sweep structure disclosed herein, e.g., structure 107, 207*a* as described above. In certain embodiments, a fuel system 100 includes one or more fuel lines 122 connected to one or more fuel system components 103 *a, b, c, d, e* at one or more connections (e.g., fittings 118 connected to opening 126*a*), and a sweep system (e.g., being or including sweep structure 107, 207*a*) defining a fluid path (e.g. flow path 109) surrounding the one or more fuel lines 122 and each connection between each of the one or more fuel lines 122 and the one or more connections. The sweep system can be configured to allow sweeping of leaked fuel from the fuel lines 122 to a vent 113, 213. In certain embodiments, the sweep system includes a retainable, moveable component (e.g., fitting structure 118) configured to provide access to the one or more connections and/or to allow removal of one or more components of the sweep system when moved to an access position (e.g., as shown in FIG. 6). The fuel system can include any suitable embodiment of a sweep system and/or sweep structure in accordance with this disclosure.

Certain embodiments can include an outer secondary air vent tube fitted around a primary tube carrying a primary fluid to a component, the secondary air vent tube configured to capture and vent any leaks from the primary tube, or from the primary tube interface with the component. The outer tube can have an axially retractable connector with a vent line. The connector can have two sealing elements that interface with two surfaces, one sealing surface interface can be with the component and another can be with the outer (secondary) tube.

In certain embodiments, the vent lines may be connected between adjacent outer tubes via a bypass bridge tube. In certain embodiments, the secondary tube may have an axial retention feature snap ring to fix the retractable connector in place.

Embodiments can include a structures for providing air venting for a hydrogen supply line to contain and seal both air vent flow and any hydrogen fluid leakage flow coming from hydrogen unit-supply line connectors and while also permitting easy access to hydrogen unit and supply line connectors in order to perform maintenance, inspection, and/or hydrogen unit-line replacement in the field. Embodiments can provide a solution to contain both air vent flow and any hydrogen fluid leakage flow from a hydrogen fuel system. Typical aircraft engine fuel supply systems contain multiples fitting and coupling connections that may lead to hydrogen fluid leakages. While the systems and methods described herein are described with respect to aircraft fuel systems, it is contemplated that such systems and methods can be employed to other engines in fields outside of aerospace. For example, embodiments can be utilized with a fuel supply leakage detection and purging system for any gas fuel (e.g., hydrogen) engine. Moreover, the systems and methods can be used to detect and purge leaks from anywhere within the aircraft, for example outside the engine systems, including the aircraft hydrogen tank, or in a faulty hydrogen shut-off valve.

Embodiments provide a way to allow both sweeping and access to hydrogen line fittings/connectors, and to be able to disassemble/reassemble those hydrogen supply line connections.

Embodiments can include an air vent/purge tubing and fitting mechanical arrangement for a hydrogen supply line. Embodiments can include a mechanical arrangement that has an air vent connector, which can make a second "layer" between the hydrogen unit connector and the inter-tube seal housing tube, which, at both ends, the interface can be sealed by a sealing element which allows containing of air vent flow and also containing of any hydrogen fluid leakage flow coming from the hydrogen connectors or a defective hydrogen supply tube (e.g., cracks due to hydrogen embrittlement/HCF-LCF). Another function of the air vent connector can also be to redirect both air vent flow from air vent tube and any hydrogen fluid leakage flow into the air vent "bridge" tube. The air vent "bridge" tube can then be connected to the next hydrogen unit-air vent connection part of the air vent/purging network system.

In order to access to hydrogen unit and hydrogen supply line connection to perform maintenance, inspection, and/or hydrogen unit-supply line replacement, the axial retention element can be removed from the groove which allows the air vent connector to slide right to left (as shown in FIG. 6) and disengage sealing elements from the sealing interfaces. In certain embodiments, the air vent "bridge" tube can be a flex hose which permits flexibility and movement during sliding of air vent connector which does not require any disconnection at the end fitting between. Alternatively, a rigid tube can be used.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvements in the art to which they pertain. While the subject disclosure includes reference to certain embodiments, those skilled in the art will readily appreciate that changes and/or modifications may be made thereto without departing from the spirit and scope of the subject disclosure.

For example, the following particular embodiments of the present technology are likewise contemplated, as described herein next by clauses.

Clause 1. A fuel system (100) of an aircraft engine (10), comprising:
a fuel conduit interface (102) connecting a fuel conduit (104) to a component (103) of the fuel system (100); and
a sweep line structure (107, 207) having:
an inner surface (108) facing toward, extending around, and defining a cavity (110) around the fuel conduit interface (102), and
an outer surface (112) opposite the inner surface (108), the cavity (110) being fluidly sealed relative to the outer surface (112).

Clause 2. The fuel system of clause 1, further comprising a vent conduit (113, 213) that includes the cavity (110) of the sweep line structure (107, 207) and fluidly connects to atmosphere.

Clause 3. The fuel system of any preceding clause, wherein the fuel conduit interface is a plurality of fuel conduit interfaces of the fuel system of the aircraft engine, wherein the vent conduit includes a plurality of cavities, the cavity of each fuel conduit interface of the plurality of fuel conduit interfaces being one of the plurality of cavities; wherein the sweep line structure is a plurality of sweep line structures; and wherein the inner surface of each sweep line structure of the plurality of sweep line structures defines the cavity around a fuel conduit interface of the plurality of fuel conduit interfaces that corresponds to that sweep line structure.

Clause 4. The fuel system of any preceding clause, wherein the plurality of fuel conduit interfaces includes one of or a combination of two or more of any one of:

a fuel conduit interface defined by a fuel connection to a fuel nozzle manifold (105), a fuel conduit interface defined by a fuel connection to a fuel manifold shutoff valve (103*e*), a fuel conduit interface defined by a fuel connection to a gaseous hydrogen metering unit (103*d*), a fuel conduit interface defined by a fuel connection to a pressure reducing valve (103*c*), a fuel conduit interface defined by a fuel connection to a gaseous hydrogen accumulator (103*b*), and a fuel conduit interface defined by a fuel connection to a liquid pump (103*a*).

Additional particular embodiments of the present technology are also contemplated, as described herein next by additional clauses.

Clause 5. An aircraft engine (10), comprising:

a compressor (14) supplying pressurized air to a primary gas path (12) of the aircraft engine (10), the primary gas path (12) including fluidly in series a combustor and an exhaust nozzle receiving gas from the combustor; a bypass duct (125) defining a secondary gas path of the aircraft engine (10); and the fuel system (100) of clause 3, the fuel system supplying a fuel to the combustor, wherein the vent conduit (113, 213) vents to the atmosphere via one or both of the exhaust nozzle and the bypass duct.

Clause 6. The aircraft engine of any preceding clause, wherein the vent conduit fluidly connects to a section of the compressor (zone 1) that is at a higher pressure than pressure at an outlet (116) of the vent conduit that connects to the atmosphere.

Clause 7. The aircraft engine of any preceding clause, wherein the section is a section of the compressor at which the pressurized air is below 500 degrees Fahrenheit in all normal operating conditions of the aircraft engine.

Clause 8. The aircraft engine of any preceding clause, wherein the compressor includes a P2.4 compressor stage, a P2.5 compressor stage, and a P2.7 compressor stage; and wherein the section of the compressor is one of the P2.4 compressor stage, the P2.5 compressor stage, and the P2.7 compressor stage.

Clause 9. The aircraft engine of any preceding clause, wherein the vent conduit extends through a hot section (zone 1) of the aircraft engine, wherein the vent conduit fluidly connects to the section of the compressor at a location in the hot section and at a location outside of the hot section, and wherein at least one fuel conduit interface of the plurality of fuel conduit interfaces (102) is disposed in the hot section at a location in the vent conduit that is fluidly between the location at which the vent conduit fluidly connects to the section of the compressor and the outlet of the vent conduit that connects to the atmosphere.

Clause 10. The aircraft engine of any preceding clause, further comprising a temperature sensor (115*b*) operatively connected to the vent conduit at a location upstream of the outlet of the vent conduit, the temperature sensor operable to sense temperature of a gas at that location.

Clause 11. The aircraft engine of any preceding clause, further comprising a hydrogen sensor (115*a*) operatively connected to the vent conduit at a location upstream of the outlet of the vent conduit, the hydrogen sensor operable to sense at that location one or both of: presence of hydrogen and concentration of hydrogen.

Clause 12. The aircraft engine of any preceding clause, wherein the outlet (116) of the vent conduit is a plurality of outlets (216*a*, 216*b*) fluidly venting the vent conduit to the atmosphere at different locations in the vent conduit.

Additional particular embodiments of the present technology are also contemplated, as described herein next by additional clauses.

Clause 13. A fuel system (100), comprising:

one or more fuel circuit components (103*a, b, c, d, e*) configured to retain a flow of fuel therethrough; and a sweep structure (107, 207) defining a sweep flow path (109), the sweep structure surrounding at least a portion of the one or more fuel circuit components and configured to allow a sweep fluid to move a leaked fuel from the one or more fuel circuit components to a vent portion (113, 213).

Clause 14. The fuel system of clause 13, wherein the sweep structure includes at least one leak detection location (215*a, b*) positioned fluidly downstream from the one or more fuel circuit components and having one or more leak detection sensors (115*a, b*) connected to the sweep structure (107, 207).

Clause 15. The fuel system of any preceding clause, wherein the one or more leak detection sensors (115*a, b*) include a fuel sensor configured to detect a presence of the fuel in the sweep flow path (109).

Clause 16. The fuel system of any preceding clause, wherein the one or more leak detection sensors include a temperature sensor configured to detect a temperature in the sweep flow path.

Clause 17. The fuel system of any preceding clause, wherein the sweep structure includes an inlet (119) configured to receive sweep fluid from a source.

Clause 18. The fuel system of any preceding clause, wherein the fuel is hydrogen and the sweep fluid is pressurized air, wherein the inlet (119) of the sweep structure is configured to connect to a compressor (14) to receive compressor air.

Clause 19. The fuel system of any preceding clause, wherein the one or more fuel circuit components (103*a, b, c, d, e*) include a plurality of flow components and a plurality of fuel line segments (101, *a, b, c, d, e*) extending between each of the plurality of fuel components.

Clause 20. The fuel system of any preceding clause, wherein the sweep structure surrounds each connection (118, 146, 152) between each flow component and each fuel line.

Clause 21. The fuel system of any preceding clause, wherein the sweep structure is sealingly engaged to each flow component such that the sweep flow path is substantially sealed between the inlet and the vent portion.

Clause 22. The fuel system of any preceding clause, wherein the sweep structure includes a bypass line (125) passing around each flow component to allow continuous flow from the inlet to the vent portion.

Clause 23. The fuel system of any preceding clause, wherein the one or more fuel circuit components include a fuel nozzle manifold, wherein the vent portion is downstream of the fuel nozzle manifold.

Clause 24. The fuel system of any preceding clause, wherein the sweep structure is a first sweep structure (107, 107*a*), further comprising a second sweep structure (207*b*), wherein the first sweep structure is configured to sweep a cold zone (zone 2) portion of a fuel system to a first vent portion, wherein the second sweep structure is configured to sweep a hot zone (zone 1) portion of the fuel system to a second vent portion (213), wherein each first and second sweep structures include a respective inlet and a respective vent portion.

Clause 25. The fuel system of any preceding clause, each sweep structure includes a leak detection location positioned downstream of the one or more fuel circuit components associated with each sweep structure, wherein each sweep structure includes one or more leak detection sensors.

Clause 26. The fuel system of any preceding clause, further comprising a control module (154) configured to determine whether a leak has occurred and to operate at least one of the one or more fuel components based on the detected leak.

Clause 27. The fuel system of any preceding clause, wherein the control module is configured to shut down fuel flow if a leak is detected above a threshold.

Additional particular embodiments of the present technology are also contemplated, as described herein next by additional clauses.

Clause 28. A hydrogen fuel system (100) for an aircraft (1), comprising:
a hydrogen fuel circuit; and
a leak detection system coupled to the hydrogen fuel circuit to and configured to detect a hydrogen leak from at least a portion of the hydrogen fuel circuit by sweeping at least a portion of the hydrogen fuel circuit with a sweep gas to a leak detection location having one or more leak detection sensors.

Clause 29. The hydrogen fuel system (100) of clause 28, wherein the leak detection system includes a single sweep structure (107) configured to sweep the entire hydrogen fuel circuit between a first location and one or more fuel nozzles, wherein the one or more leak detection sensors (115a, b) are downstream of a fuel nozzle manifold in the sweep structure.

Clause 30. The hydrogen fuel system of any preceding clause, wherein the leak detection system includes a first sweep structure (207a) configured to sweep a cold zone portion of the hydrogen fuel circuit and to a first vent portion (213a), and wherein the leak detection system includes a second sweep structure (207b) configured to sweep a hot zone portion of the hydrogen fuel circuit to a second vent portion (213b).

Clause 31. The hydrogen fuel system of any preceding clause, further comprising a controller (154) configured to control one or more components in the hydrogen fuel circuit as a function of signals received from the one or more leak detection sensors.

Additional particular embodiments of the present technology are also contemplated, as described herein next by additional clause.

Clause 32. A method, comprising:
sweeping a sweep fluid over a fuel circuit to vent leaked fuel and/or to move leaked fuel to a leak detection location.

Yet additional particular embodiments of the present technology are also contemplated, as described herein next by additional clauses.

Clause 33. A sweep structure (107) for a fuel system, comprising:
a sweep line structure (121) configured to surround at least a portion of a fuel line (122) and forming a line flow cavity (110); and
a first sweep fitting structure (118) configured to engage the sweep line structure at a first axial opening (120), the first sweep fitting structure forming a fitting flow cavity (123), the first sweep fitting structure configured to surround one or more of a first end portion (122a) of the fuel line, a first end fitting (124) attached to the fuel line, and/or a first opening (126a) of a fuel system component (103a, b, c, d, e) attached to the first end fitting, wherein the first sweep fitting structure defines a first radial opening (128), the first radial opening configured to receive a bridge channel (125).

Clause 34. The sweep structure of clause 33, wherein the sweep line structure defines a first connection end (132) configured to engage with a retainer (134) to retain the sweep line structure to the first sweep fitting structure, wherein the first sweep fitting structure is configured to be moveable relative to the sweep line structure when the retainer is not engaged to the sweep line structure.

Clause 35. The sweep structure of any preceding clause, wherein the first sweep fitting structure includes a first seal groove (136) configured to receive a first seal (136a) to seal against the sweep line structure, and a second seal groove (138) configured to receive a second seal (138a) to seal against the first opening of the fuel system component.

Clause 36. The sweep structure of any preceding clause, wherein the first connection end includes a snap ring groove (140) configured to receive a snap ring to retain the first sweep fitting structure between the snap ring and the fuel system component.

Clause 37. The sweep structure of any preceding clause, wherein the first connection end defines an inner diameter mount (142) configured to mount the fuel line concentrically therethrough.

Clause 38. The sweep structure of any preceding clause, wherein the inner diameter mount (142) includes an inner diameter tube shape axially extending from the first connection end (132).

Clause 39. The sweep structure of any preceding clause, wherein the first connection end defines one or more holes (144) defined at least partially axially therethrough to allow sweep flow to pass through the first connection end.

Clause 40. The sweep structure of any preceding clause, further comprising a bridge channel (125) disposed in fluid commination with the first sweep fitting structure (118) and configured to direct sweep flow around the fuel system component.

Clause 41. The sweep structure of any preceding clause, wherein the bridge channel is a flexible hose configured to allow the first sweep fitting structure to move relative to the sweep line structure without disconnecting the bridge channel from the first sweep fitting structure.

Clause 42. The sweep structure of any preceding clause, wherein the bridge channel is connected to a second sweep fitting (146) structure to pass flow thereto to allow flow to a second sweep line structure (148).

Clause 43. The sweep structure of any preceding clause, wherein the sweep line structure defines a second connection end (150) at an opposite end relative to the first connection end (132), wherein the second connection end is the same as the first connection end.

Clause 44. The sweep structure of any preceding clause, further comprising a second sweep fitting structure (152) configured to engage to the second connection end (150).

Clause 45. The sweep structure of any preceding clause, wherein the second sweep fitting structure is the same as the first sweep fitting structure.

Clause 46. The sweep structure of any preceding clause, comprising a series of sweep line structures connected in series via respective sweep fitting structures.

Additional particular embodiments of the present technology are also contemplated, as described herein next by additional clauses.

Clause 47. A fuel system (100), comprising:
a fuel line (122);
a fuel system component (103, *a, b, c, d, e*) in fluid communication with the fuel line and connected to the fuel line at a first opening thereof (122*a*); and
a sweep system (107, 207) comprising:
a sweep line structure (121) configured to surround at least a portion of the fuel line and forming a line flow cavity (110); and
a first sweep fitting structure (118) configured to engage the sweep line structure at a first axial opening (126*a*), the first sweep fitting structure forming a fitting flow cavity (123), the first sweep fitting structure configured to surround one or more of a first end portion (122*a*) of the fuel line, a first end fitting (124) attached to the fuel line, and/or the first opening of the fuel system component attached to the first end fitting, wherein the first sweep fitting structure defines a first radial opening (128), the first radial opening configured to receive a bridge channel (125).

Clause 48. The system of clause 47, wherein the sweep line structure defines a first connection end (132) configured to engage with a retainer (134) to retain the sweep line structure to the first sweep fitting structure, wherein the first sweep fitting structure is configured to be moveable relative to the sweep line structure when the retainer is not engaged to the sweep line structure.

Clause 49. The system of any preceding clause, wherein the first sweep fitting structure includes a first seal groove (136) configured to receive a first seal (138*a*) to seal against the sweep line structure, and a second seal groove (138) configured to receive a second seal (138*a*) to seal against the first opening of the fuel system component.

Clause 50. The system of any preceding clause, wherein the first connection end includes a snap ring groove (140) configured to receive a snap ring (142) to retain the first sweep fitting structure between the snap ring and the fuel system component.

Clause 51. The system of any preceding clause, wherein the first connection end defines an inner diameter mount (144) configured to mount the fuel line concentrically therethrough.

Additional particular embodiments of the present technology are also contemplated, as described herein next by additional clauses.

Clause 52. A fuel system (100), comprising:
one or more fuel lines (122) connected to one or more fuel components (103*a, b, c, d, e*) at one or more connections; and
a sweep system (107, 207) defining a fluid path surrounding the one or more fuel lines and each connection between each of the one or more fuel lines and the one or more connections (124), the sweep system configured to allow sweeping of leaked fuel from the fuel lines to a vent (113, 213), wherein the sweep system includes a retainable moveable component (118) configured to provide access to the one or more connections and/or to allow removal of one or more components of the sweep system when moved to an access position.

What is claimed is:
1. A fuel system of an aircraft engine, comprising:
a hydrogen fuel source;
a hydrogen fuel circuit including a first fuel conduit interface connecting a first fuel conduit to a component of the fuel system and a second fuel conduit interface connecting a second fuel conduit to the component;
a flow of hydrogen passing in serial order from the hydrogen fuel source through the first fuel conduit, the first fuel conduit interface, the component, the second fuel conduit interface, and the second fuel conduit; and
a leak detection system operatively coupled to the hydrogen fuel circuit, the leak detection system including:
a source of sweep fluid;
a sweep line structure extending from an inlet to a vent along the hydrogen fuel circuit, the inlet in fluid communication with the source of sweep fluid at an upstream end of the hydrogen fuel circuit, the vent disposed downstream of the second fuel conduit interface at a downstream end of the hydrogen fuel circuit, the sweep line structure having:
a first inner surface facing toward, extending around, and defining a first cavity around the first fuel conduit interface,
a first outer surface opposite the first inner surface, the first cavity being fluidly sealed relative to the first outer surface,
a second inner surface facing toward, extending around, and defining a second cavity around the second fuel conduit interface,
a second outer surface opposite the second inner surface, the second cavity being fluidly sealed relative to the second outer surface, and
a bypass line including a flexible hose in fluid communication with the first cavity and passing around the component to fluidly communicate with the second cavity;
a hydrogen sensor operatively connected to the sweep line structure downstream of the second fuel conduit interface; and
a controller operatively connected to the hydrogen sensor and the component, the controller configured to send control commands to the component as a function of signals received from the hydrogen sensor, the controller further configured to generate control commands to increase the flow of the sweep fluid to dilute concentration of hydrogen in the sweep line structure when a hydrogen leak is detected;
wherein the component includes any one of:
a fuel manifold shutoff valve,
a gaseous hydrogen metering unit,
a pressure reducing valve,
a gaseous hydrogen accumulator, and
a liquid hydrogen pump.

2. The fuel system of claim 1, wherein the vent includes a vent conduit that fluidly connects to atmosphere.

3. An aircraft engine, comprising:
a compressor supplying pressurized air to a primary gas path of the aircraft engine, the primary gas path including fluidly in series a combustor and an exhaust nozzle receiving gas from the combustor;
a bypass duct defining a secondary gas path of the aircraft engine; and
a fuel system including:
a hydrogen fuel source;
a hydrogen fuel circuit in fluid communication with the hydrogen fuel source, the hydrogen fuel circuit having a first fuel conduit interface connecting a first fuel conduit to a component of the fuel system and a second fuel conduit interface connecting a second fuel conduit to the component;
a hydrogen flow passing in serial order from the hydrogen fuel source through the first fuel conduit, the first fuel conduit interface, the component, the second fuel conduit interface, and the second fuel conduit;

a sweep line structure having:
a first inner surface facing toward, extending around, and defining a first cavity around the first fuel conduit interface,
a first outer surface opposite the first inner surface, the first cavity being fluidly sealed relative to the first outer surface,
a second inner surface facing toward, extending around, and defining a second cavity around the second fuel conduit interface,
a second outer surface opposite the second inner surface, the second cavity being fluidly sealed relative to the second outer surface, and
a bypass line including a flexible hose in fluid communication with the first cavity and passing around the component to fluidly communicate with the second cavity;
wherein the component includes any one of:
a fuel manifold shutoff valve,
a gaseous hydrogen metering unit,
a pressure reducing valve,
a gaseous hydrogen accumulator, and
a liquid hydrogen pump; and
a vent conduit fluidly connected to the second cavity of the sweep line structure; and
a hydrogen leak detection system including:
a hydrogen sensor installed in the vent conduit; and
a control unit operatively connected to the hydrogen sensor, the control unit configured to generate control commands to both reduce the hydrogen flow and increase sweep flow through the sweep line structure when a concentration of hydrogen in the sweep line structure is above a threshold.

4. The aircraft engine of claim 3, wherein the sweep line structure includes an inlet that fluidly connects to a section of the compressor that is at a higher pressure than pressure at an outlet of the vent conduit that connects to atmosphere.

5. The aircraft engine of claim 4, wherein the section of the compressor is a section of the compressor at which the pressurized air is below 500 degrees Fahrenheit in all normal operating conditions of the aircraft engine.

6. The aircraft engine of claim 4, wherein the compressor includes a P2.4 compressor stage, a P2.5 compressor stage, and a P2.7 compressor stage; and the section of the compressor is one of the P2.4 compressor stage, the P2.5 compressor stage, and the P2.7 compressor stage.

7. The aircraft engine of claim 4, wherein the aircraft engine has a hot section and a cold section,
wherein the sweep line structure is a first sweep line structure extending through the cold section of the aircraft engine,
wherein a second sweep line structure extends through the hot section, the second sweep line structure having an inlet fluidly connecting to the section of the compressor at a location in the hot section,
wherein the vent conduit of the first sweep line structure is a first vent conduit, the inlet of the first sweep line structure connecting to the section of the compressor at a location outside of the hot section;
the second sweep line structure has a fuel conduit interface disposed in the hot section at a location in the second sweep line structure extending through the hot section that is fluidly between the inlet of the second sweep line structure and an outlet of a vent conduit of the second sweep line structure that is a second vent conduit, wherein the second vent conduit connects to the atmosphere, and
wherein the control module is configured to react differently whether the hydrogen leak is detected in the hot section or the cold section of the aircraft engine.

8. The aircraft engine of claim 7, wherein the first and second vent conduits fluidly vent to the atmosphere at different locations.

9. A fuel system of an aircraft engine, comprising:
a hydrogen fuel source;
a hydrogen fuel circuit in fluid communication with the hydrogen fuel source, the hydrogen fuel circuit including a first fuel conduit interface connecting a first fuel conduit to a fuel system component and a second fuel conduit interface connecting a second fuel conduit to the fuel system component:
a flow of hydrogen passing in serial order from the hydrogen fuel source through the first fuel conduit, the first fuel conduit interface, the fuel system component, the second fuel conduit interface, and the second fuel conduit;
a sweep flow source;
a sweep line structure extending from an inlet to a vent, the inlet fluidly connected to the sweep flow source at an upstream end of the hydrogen fuel circuit, the vent disposed downstream of the second fuel conduit interface relative to the flow of hydrogen, the sweep line structure having:
a first inner surface facing toward, extending around, and defining a first cavity around the first fuel conduit interface,
a first outer surface opposite the first inner surface, the first cavity being fluidly sealed relative to the first outer surface,
a second inner surface facing toward, extending around, and defining a second cavity around the second fuel conduit interface,
a second outer surface opposite the second inner surface, the second cavity being fluidly sealed relative to the second outer surface,
a bypass line including a flexible hose in fluid communication with the first cavity and passing around the fuel system component to fluidly communicate with the second cavity,
a hydrogen sensor operatively connected to the sweep line structure downstream of the second fuel conduit interface; and
a controller operatively connected to the hydrogen sensor and the fuel system component, the controller configured to send control commands to the fuel system component as a function of signals received from the hydrogen sensor, the controller further configured to generate control commands to increase a flow of a sweep fluid from the sweep flow source when a hydrogen leak is detected;
wherein the fuel system component includes any one of a gaseous hydrogen metering unit, a pressure reducing valve, a gaseous hydrogen accumulator, and a liquid hydrogen pump, and
wherein the sweep line structure is configured to allow the sweep fluid from the sweep flow source to move a leaked fuel from the fuel system component to the vent to vent the leaked fuel to atmosphere.

* * * * *